(12) United States Patent
Shah

(10) Patent No.: US 6,872,770 B2
(45) Date of Patent: Mar. 29, 2005

(54) MOISTURE-CURING ADHESIVES

(75) Inventor: Pankaj Shah, Crystal Lake, IL (US)

(73) Assignee: Rohm and Haas Company, Philadelphia, PA (US)

( * ) Notice: Subject to any disclaimer, the term of this patent is extended or adjusted under 35 U.S.C. 154(b) by 26 days.

(21) Appl. No.: 10/303,559

(22) Filed: Nov. 25, 2002

(65) Prior Publication Data

US 2003/0109624 A1 Jun. 12, 2003

Related U.S. Application Data

(60) Provisional application No. 60/334,433, filed on Dec. 3, 2001.

(51) Int. Cl.$^7$ .............................. C08L 75/04; C08K 3/36
(52) U.S. Cl. ....................... 524/493; 524/492; 524/590; 428/423.1
(58) Field of Search ................................ 524/493, 492, 524/590; 428/423.1

(56) References Cited

U.S. PATENT DOCUMENTS

| | | | |
|---|---|---|---|
| 4,076,684 A | * | 2/1978 | Wohlfarth et al. .......... 524/861 |
| 4,962,138 A | | 10/1990 | Kimball |
| 5,179,186 A | * | 1/1993 | Muller et al. ................. 528/49 |
| 5,525,663 A | | 6/1996 | Oien |
| 5,939,499 A | | 8/1999 | Anderson |

FOREIGN PATENT DOCUMENTS

| | | |
|---|---|---|
| DE | 4234273 | 4/1993 |
| DE | 19512551 | 10/1996 |
| EP | 0 349 897 | 1/1990 |
| EP | 0386879 | 9/1990 |
| EP | 0764670 | 3/1997 |

OTHER PUBLICATIONS

R. Halversen, "Cristobalite: A Unique Form of Silica," *Adhesive Age*, Aug. 1997, pp. 58–62.

M.A. Chronister, "Heating Up," *Adhesive Age*, vol. 44, pp. 34–40, 2001.

"Goresil™", published by C.E.O. Process Minerals, Inc., Akron, Ohio, USE.

* cited by examiner

*Primary Examiner*—Ana Woodward
(74) *Attorney, Agent, or Firm*—Carl P. Hemenway

(57) ABSTRACT

An improved urethane reactive hot-melt adhesive is provided that improves the green strength of bonded joints is provided. Also provided are an improved method of bonding articles together with such an adhesive and improved composite articles bonded together with such an adhesive.

4 Claims, No Drawings

MOISTURE-CURING ADHESIVES

CROSS REFERENCE TO RELATED PATENT APPLICATIONS

This is a non-provisional application of prior pending U.S. provisional application Ser. No. 60/334,433 filed Dec. 3, 2001.

This invention relates to improved moisture-curing hot-melt adhesives that impart improved green strength to composites.

BACKGROUND

Hot melt adhesives are known as useful materials. At room temperature, they are solid or have very high viscosity, but at elevated temperatures they have much lower viscosity and can be conveniently applied to a substrate. A second substrate can be contacted with the melted adhesive layer, and the adhesive bond becomes stronger as the composition cools and the adhesive re-solidifies or re-builds high viscosity. Because the cooling happens relatively quickly, the composition or composite article develops good green strength (i.e., the bond is reasonably strong soon after the materials are brought together). Hot melt adhesives are often based on thermoplastic polymers, and composite articles made with such adhesives often develop good green strength, but they generally lose strength when the article is heated or when it is exposed to solvents.

In contrast, curable adhesives (synonymous herein with "reactive adhesives"), once cured, generally maintain their adhesive properties when heated and/or exposed to solvents. However, such adhesives generally are fluid before they cure and thus have poor green strength.

A class of materials that has a useful level of green strength and has the performance advantages of curable adhesives is the reactive hot melt (RHM) adhesive. These are materials that are solid or have very high viscosity at room temperature, but they have low viscosity at elevated temperatures and can be used to assemble composite articles in a manner similar to that employed with thermoplastic hot melt adhesives. Then, as the RHM cools, it develops some green strength quickly. Later, as its curing reaction proceeds over time, the RHM adhesive develops the full advantages of a cured reactive adhesive. RHM compositions based on a mixture of an isocyanate-functional prepolymer based on a polyether polyol, a polyester polyol, or mixtures thereof, and a polyether polyester thermoplastic elastomer are disclosed by Anderson et. al. in U.S. Pat. No. 5,939,499. The isocyanate groups on isocyanate-functional compositions are believed to form bonds with each other by a reaction with water, and such compositions are examples of moisture-curable (also called "moisture reactive") compositions.

The use of cristobalite silica as a filler in various polymers has been discussed by R. Halvorsen in "Cristobalite: A Unique Form of Silica" in Adhesives Age, August 1997, pp. 58–62.

RHM adhesives generally have better green strength than ordinary curable adhesives, but further improvements in green strength are desirable, to improve the ease of handling bonded articles as soon as possible after assembly. I have found that the inclusion of cristobalite silica in moisture-curable hot-melt adhesive compositions improves the green strength of those compositions.

Statement of the Invention

In a first aspect of the present invention, there is provided a composition useful as an adhesive comprising (a) 1% to 50% by weight based on the weight of said composition of cristobalite silica, and
(b) 50% to 99% by weight based on said composition of moisture curable prepolymer.

In a second aspect of the present invention, there is provided a method for bonding substrates together comprising melting an adhesive composition; applying said melted adhesive composition to a first substrate; contacting a second substrate to said melted adhesive composition; cooling said substrates and said adhesive composition, or allowing them to cool; wherein said adhesive composition comprises 1% to 50% by weight based on the weight of said composition of cristobalite silica, and 50% to 99% by weight based on the weight of said composition of moisture curable prepolymer.

In a third aspect of the present invention, there is provided a composite comprising a first substrate, a second substrate, and an adhesive composition bonding said substrates together, wherein said adhesive composition comprises 1% to 50% by weight based on the weight of said composition of cristobalite silica, and 50% to 99% by weight based on the weight of said composition of moisture curable prepolymer.

In a fourth aspect of the present invention, there is provided a method for increasing the green strength of composite articles bonded with a moisture-curing reactive hot-melt adhesive composition, said method comprising melting said adhesive composition; applying said melted adhesive composition to a first substrate; contacting a second substrate to said melted adhesive composition; cooling said substrates and said adhesive composition, or allowing them to cool; wherein said adhesive composition comprises 1% to 50% by weight based on the weight of said composition of cristobalite silica, and 50% to 99% by weight based on the weight of said composition of moisture curable prepolymer.

DETAILED DESCRIPTION

The composition of this invention is a moisture curable hot melt adhesive composition. By "moisture curable" (herein synonymous with "moisture reactive") is meant herein that the composition contains reactive groups that are capable of reacting with water desirably to effect an increase in the molecular weight of the adhesive composition and/or effect crosslinking of the adhesive composition so as to increase the strength properties of the adhesive subsequent to being contacted with water. By "hot melt" is meant herein that the adhesive which may be a solid, semi-solid, or viscous mass can be advantageously heated to provide a fluid adhesive of a viscosity suitable for application to and adhesion to substrates. By "green strength," is meant herein the force or stress required to separate two substrates a short time after they have been brought together with an adhesive between them, generally before substantial curing or crosslinking has occurred.

In the practice of the present invention, one ingredient is cristobalite silica, which is a form of silicon dioxide that occurs naturally and that can also be produced artificially by heating quartz sand in a kiln. Cristobalite silica is described, for example, in "Goresil™, " a publication available from C.E.O. Process Minerals, Inc., of Akron, Ohio, USA. Cristobalite silica is known to have different crystal structure, refractive index, density, hardness, coefficient of thermal expansion, and surface composition from other forms of silica. It is believed that the surface composition causes cristobalite silica to pick up less moisture than other mineral powders. Cristobalite silica can be obtained commercially as a powder of various particle size distributions. Suitable cristobalite silica powders may be sufficiently fine so that 98% or more by weight of the powder will pass through a 100-mesh screen; as disclosed in Specification E-11-01, published by the American Society for Testing and Materials, a 100-mesh screen has a nominal opening size of 150 micrometers ($\mu$m). Preferred cristobalite silica powders have 95% or more passing through a 325-mesh screen, which has a nominal opening size of 45 $\mu$m; more preferred is a powder with median particle size of 8 $\mu$m or less and a top particle size of 35 $\mu$m or less; even more preferred is powder with median particle size of 0.5 to 5 $\mu$m and a top particle size of 25 $\mu$m or less, and most preferred is powder with median particle size of 1 to 3 $\mu$m and a top particle size of 10 $\mu$m or less. A suitable amount of cristobalite silica is 1 to 50% by weight based on the weight of the total reactive hot melt composition; preferred is 5 to 30%, and more preferred is 9 to 16%.

In the practice of the present invention, suitable moisture curable prepolymers are any oligomers, resins, or polymers that are moisture curable as described herein and that can reasonably be applied to substrates in the manner of a hot melt adhesive, for example as defined herein-above. Preferred moisture curable prepolymers are moisture curable siloxanes and moisture curable urethane prepolymers; more preferred are moisture curable urethane prepolymers.

In one embodiment of the present invention, the moisture curable polymer is a urethane prepolymer that is a reaction product (referred to herein as an "RP prepolymer") of at least one polyol and at least one polyfunctional isocyanate. Suitable polyols include, for example, polyether polyols, polyester polyols, polyether esters, polyester ethers, and mixtures thereof. The polyol(s) which may be used for forming the RP prepolymer may be independently selected from crystalline, semi-crystalline, or amorphous polyols; generally, increasing crystalline polyol content increases bond strength development. The polyols preferably have a weight average molecular weight ("Mw") as measured by gel permeation chromatography from 250 to 8,000, more preferably from 250 to 5,000.

Polyester polyols suitable for use in RP prepolymers include those formed from diacids, or their monoester, diester, or anhydride counterparts, and diols. The diacids may be saturated $C_4$–$C_{12}$ aliphatic acids, including branched, unbranched, or cyclic materials, and/or $C_8$–$C_{15}$ aromatic acids. Examples of suitable aliphatic acids include, for example, succinic, glutaric, adipic, pimelic, suberic, azelaic, sebacic, 1,12-dodecanedioic, 1,4-cyclohexanedicarboxylic, and 2-methylpentanedioic acids. Examples of suitable aromatic acids include, for example, terephthalic, isophthalic, phthalic, 4,4'-benzophenone dicarboxylic, 4,4'-diphenylamine dicarboxylic acids, and mixtures thereof. The diols may be $C_2$–$C_{12}$ branched, unbranched, or cyclic aliphatic diols. Examples of suitable diols include, for example, ethylene glycol, 1,3-propylene glycol, 1,2-propylene glycol, 1,4-butandediol, neopentyl glycol, 1,3-butandediol, hexanediols, 2-methyl-2,4-pentanediol, cyclohexane-1,4-dimethanol, 1,12-dodecanediol, and mixtures thereof. Other suitable polyester polyols include polycaprolactone polyols and polycarbonate polyols. Suitable polyester polyols may be produced by reacting a suitable diacid or a mixture of suitable diacids with a suitable diol or with a mixture of suitable diols. Also, mixtures of the various suitable polyester polyols are also suitable for use in the present invention. Preferred polyester polyols are butane diol adipates, neopentyl glycol adipates, adipate polyester polyols produced from mixed diols, hexane diol adipates, and polyester polyols produced from phthalic acid and diethylene glycol.

Polyether polyols suitable for use in RP prepolymers include polyoxy-$C_2$–$C_6$-alkylene polyols, including branched and unbranched alkylene groups. Also suitable are polytetramethyleneglycolether polyols. Examples of suitable polyether diols include, for example, polyethylene oxide, poly(1,2- and 1,3-propyleneoxide), poly(1,2-butyleneoxide), random or block copolymers of ethylene oxide and 1,2-propylene oxide, and mixtures thereof. Mixtures of the various suitable polyether polyols are also suitable for use in the present invention. Preferred are propylene oxide polymers, also called polypropylene glycols.

For forming the RP prepolymer, the polyol is reacted with at least one polyfunctional isocyanate, i.e., an isocyanate bearing at least two isocyanate groups. Suitable polyfunctional isocyanates include, for example, aromatic, aliphatic, cycloaliphatic polyfunctional isocyanates and combinations thereof, such as, for example, m-phenylene diisocyanate, 2,4-toluene diisocyanate, 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmethane diisocyanate, isophorone diisocyanate, 4,4',4"triphenylmethane triisocyanate, polymethylene polyphenylene polyfunctional isocyanate, 2,4,6-toluene triisocyanate, and 4,4'-dimethyl-diphenylmethane tetraisocyanate, prepolymers having Mn less than 2000 and bearing at least two isocyanate groups, and mixtures thereof. Preferred is a mixture of 4,4'-diphenylmethane diisocyanate and 2,4'-diphenylmethane diisocyanate.

The RP prepolymer of the present invention may be made by a one-stage process, a two-stage process, or a multi-stage process. Mixtures of suitable RP prepolymers are also suitable for use in the present invention.

In an embodiment of the present invention in which the RP prepolymer is made using a one-stage process, at least one polyol is mixed with at least one polyfunctional isocyanate. Suitable mixtures have a ratio of NCO/OH groups of the components on an equivalents basis of from 1.05 to 3.0, preferably from 1.5 to 2.2, and more preferably from 1.8 to 2.1. The components contain less than 1% water, preferably less than 0.1% water. The components may be mixed by conventional means, preferably in an inert, dry atmosphere, and reacted, preferably at a temperature of 80° C. to 120° C., preferably for a time sufficient to react substantially all of the hydroxyl groups.

In this embodiment of the present invention, cristobalite silica is added to the reaction mixture either before, during, or after the reaction to form the RP prepolymer takes place. Cristobalite silica is preferably added during a time when the reaction mixture has low enough viscosity to be stirred, so that the cristobalite silica can be mixed with the other components. More preferably, the cristobalite silica is added to the polyol(s) when they are warm enough to have low viscosity but before the polyfunctional isocyanate(s) are added.

In another embodiment of the present invention, the RP prepolymer may be prepared by a two-stage process. In the first stage, a hydroxyl-functional initial polymer is formed by reacting the first components including a polyol selected from the group including polyether polyols, polyester polyols, and mixtures thereof and a polyfunctional isocyanate, the ratio of OH/NCO groups of the first components on an equivalents basis being from 1.05 to 3.0. The first components contain less than 1% water, preferably less than 0.1% water, by weight based on the total weight of the components. The first components may be mixed by conventional means, preferably in an inert, dry atmosphere, and reacted, preferably at a temperature of 80° C. to 120° C.

In this embodiment of the present invention, the second stage may include admixing second components comprising the hydroxyl-functional initial polymer, a polyol selected from the group including polyester polyols, polyether polyols, and mixtures thereof and at least one polyfunctional isocyanate, the weight ratio of the hydroxyl-functional initial polymer to the polyol(s) included in the second components being from 9/1 to 1/9, and reacting, or allowing to react, the admixture. The hydroxyl-functional initial polymer has been described herein-above. The polyol(s) may be crystalline, semi-crystalline, or amorphous and may be selected from those polyols described and exemplified hereinabove and may be the same as or different from the polyol(s) used in forming the hydroxyl-functional initial polymer. Preferred is a polyol which is a crystalline polyester polyol. The at least one polyfunctional isocyanate may be selected from those polyfunctional isocyanates described and exemplified herein-above and may be the same as or different from the polyfunctional isocyanate(s) used in forming the hydroxyl-functional initial polymer.

In this two-stage embodiment of the present invention, during the second stage the ratio of NCO/OH groups from all of the admixed second components taken on an equivalents basis is from 1.05 to 3.0, preferably from 1.5 to 2.2, and more preferably from 1.8 to 2.1, in order to provide an adhesive composition with an excess of isocyanate groups. Higher levels of the NCO/OH ratio would result in higher than desired levels of free isocyanate monomer, and lower levels of the NCO/OH ratio would result in higher than desired application viscosity. The second components contain less than 1% water, preferably less than 0.1% water, by weight based on the total weight of the components.

In this two-stage embodiment of the present invention, during the second stage the second components may be mixed by conventional means, preferably in an inert, dry atmosphere, and reacted, preferably at a temperature of 80° C. to 120° C., preferably for a time sufficient to react substantially all of the hydroxyl groups. Cristobalite silica is added to the reaction mixture either before, during, or after any of the reactions to form the RP prepolymer takes place. Cristobalite silica is preferably added during a time when the reaction mixture has low enough viscosity to be stirred, so that the cristobalite silica can be mixed with the other components. More preferably, the cristobalite silica is added to the polyol(s) of the first components when they are warm enough to have low viscosity but before the polyfunctional isocyanate(s) are added.

In other embodiments of the present invention, the RP prepolymer may be made by processes using multiple stages involving polyol(s) and polyfunctional isocyanate(s) described herein-above, so long as the resulting RP prepolymer has sufficient available isocyanate groups as to be moisture-curable and has low enough viscosity when heated to function usefully as a component of a RHM adhesive. Cristobalite silica may be added to the RP prepolymer in the same manners and amounts as in the one- and two-stage processes.

In the embodiments of the present invention involving a one-stage, two-stage, or multiple-stage processes, an optional catalyst may be used before, during, or after the reaction to form the RP polymer. The optional catalyst may be, for example, an amine catalyst such as a tertiary amine, or it may be a tin-based catalyst. Typically such catalysts are used at levels less than 0.5% by weight based on the total weight of the admixed components. Other optional components that may be added to the reaction mixture before, during, or after the reaction to form the RP polymer include ultraviolet indicators, antioxidants, benzoyl chloride, and silane compounds. All optional components are preferably added at a time when the reaction mixture has low enough viscosity to allow reasonable stirring to mix the ingredients.

The prepolymer of the present invention, whether siloxane, urethane, or other type, may be formulated by admixing therewith additional conventional ingredients such as tackifiers, plasticizers, rheology modifiers, fillers other than cristobalite silica, pigments, thermoplastic acrylic resins, etc. with due regard to the reactivity of the water-reactive groups which are desirably maintained. Any such optional ingredients are preferably added during a time when the reaction mixture has low enough viscosity to be stirred.

The prepolymer of the present invention is a moisture-curable hot-melt adhesive. It is stored, preferably under an inert, dry atmosphere, until use.

In the method of the present invention for bonding substrates, the moisture-curable hot-melt adhesive is heated to a temperature of 80–140° C., preferably to a temperature of 100° C. to 130° C., in order to achieve a viscosity suitable for transporting the adhesive, such as by pumping or gravity feed, to the application equipment and for the application of the adhesive to a first substrate in the presence of moisture. The application of the adhesive may be effected by conventional means such as, for example, heated spray applicator, heated bead applicator, heated nozzle, or heated roll coater, to form a continuous or discontinuous film of adhesive, as desired. The adhesive may typically be applied at a level of 50 to 250 g/sq. meter (4–20 g/sq. ft) although in cases where one of the substrates is a fabric it may be applied at a level as low as 1–50 g/sq. meter. It is contemplated that moisture, i.e., water, which is anticipated to effect reaction with the water-reactive groups thereby increasing the ultimate cohesive strength of the applied adhesive, may be, for example, a result of ambient humidity, artificially increased or controlled humidified air, a mist of water droplets, or a spray of liquid water contacting the applied adhesive. It is further contemplated that the moisture may be augmented by other ingredients that react with the water-reactive groups on the prepolymer, such as, for example, amines. In alternative embodiments the reactive hot melt adhesive may be applied to a substantially dry first substrate in the absence of contact with moisture and either stored in the absence of moisture for subsequent use or contacted with a second substrate in the presence or absence of moisture.

In the method of the present invention for bonding substrates, the applied adhesive is subsequently contacted by a second substrate to provide a composite construction. The composite construction is optionally subjected to applied pressure, and the amount of pressure generally depends on the strength and deformability of the substrates. The amount and duration of the optionally applied pressure is chosen to effect increased contact of the substrates with the adhesive. The composite construction is then cooled or allowed to cool.

In one embodiment of the present invention, the composite structure that is formed is a laminate construction. In formation of a laminate construction, when optional pressure is applied after bringing the substrates and adhesive together, one method of applying the pressure is by passing the laminate construction between rollers, typically under a pressure of 100 to 2,000 kg per meter (6 to 112 lbs per lineal inch) depending on the strength and deformability of the substrates. The amount and duration of the optionally applied pressure is chosen to effect increased contact of the substrates with the adhesive. The laminate construction is then cooled or allowed to cool.

In another embodiment, the adhesive may be simultaneously or sequentially applied to two or more surfaces of the first substrate. The resulting two or more layers of adhesive are then simultaneously or sequentially bonded to two or more further substrates, which may be the same or different. It is further contemplated that the composite construction may subsequently be bonded to other substrate (s) using the same or a different adhesive before or after the process described herein.

The first, second, and optional further substrates to be bonded in the method of this invention may be the same or different and include, for example, metal, wood, consolidated wood products, paper, woven and nonwoven fabrics, and plastics which may have smooth or structured surfaces and may be provided in the foirin, for example, of rolls, sheets, films, foils, etc. They include, for example, lauan mahogany plywood, impregnated paper, extruded polystyrene foam, expanded polystyrene foam, fiberglass reinforced polyester, polyester fabric, high or low pressure laminate, plywood, aluminum, steel, PVC, engineering or other plastics, plastics formulated with fillers and/or pigments, and plastics formulated with fibers.

A useful method for evaluating the usefulness of the present invention is the lap shear test. The adhesive is heated to 130° C. and applied to a substrate of lauan wood about 0.32 cm (⅛ inch) thick to give coverage of 100–130 g per square meter (10–12 g per square foot). A layer of fiber-reinforced plastic ("FRP") skin is applied to the adhesive layer in the presence of ambient moisture, and the composite is passed through a pinch roller at a pressure of 800–1800 kg per meter (50–100 lbs. per lineal inch). Then the lap shear strength was determined by the method of ASTM D-1002 using an Instron Model 4502 at a crosshead speed of 0.127 cm/minute (0.05 inch per minute).

In the Examples that follow, "MDI" means diphenylmethane diisocyanate;" and "hydroxyl number" is a characterization of the OH groups in a polyol, as described by K. Uhlig in *Discovering Polyurethanes*, published by Hanser, 1999.

EXAMPLES

Example 1

A reaction vessel was set up with a gas inlet tube, thermometer, stirrer, vacuum, and a heating jacket. Polyols were preheated overnight at 75–85° C. to facilitate handling. 6300 g. Rucoflex™ S 102–40 (butanediol adipate polyester polyol with OH number about 40, molecular weight about 2800, from Bayer Inc.), 1250 g. Rucoflex™ S107-55 (neopentylglycol adipate polyester polyol with OH number about 55, molecular weight about 2000, from Bayer Inc.), 3 g. Irganox™ 245 (phenolic antioxidant, from Ciba-Geigy Corp.), 12 g. Silquest™ A-171 (vinyl trimethoxysilane, from OSI Specialties), and 1000 g. Goresil™ 210 (cristobalite silica, from CED Minerals) were added to the reaction vessel and the temperature raised to 105° C. with stirring. After 30 minutes at 105° C. and a vacuum of 20 mm. of mercury, the batch temperature was lowered to 90° C. 1429 g. of 98/2 mixture of 4,4'-MDI and 2,4' MDI (Bayer Inc.) was added and the temperature was held at 100–105° C. for one hour with stirring and under nitrogen blanket. During the last 40 minutes, stirring speed was reduced and 200–300 mm. Hg vacuum was applied. After a one-hour hold, 1 g. benzoyl chloride and 5 g. Jeffcat DMDEE (amine-based catalyst, from Huntsman Co.) were added. Mixing continued for an additional 20–30 minutes under nitrogen. At this time reaction product was poured into a container which was then blanketed in dry nitrogen and sealed.

Comparative A

A reactive hot-melt adhesive was prepared as in Example 1, except that the following ingredients were omitted: Irganox™ 245, Silquest™ A-171, and Goresil™ 210. The remaining ingredients were used in the same proportions as in Example 1, but the amounts were all increased to make a preparation with the same total weight as in Example 1.

Example 2

Using the procedure of Example 1, another preparation was made. In lieu of the polyols used in Example 1, the following polyols were used: Dynacoll™ 7250 (adipate polyester based on mixed glycols, with hydroxyl number around 21, from Creanova, Inc.), Stepanpol™ agent 2429-39 (polyester based on phthalic acid and diethylene glycol, with hydroxyl number around 290, from Stepan Co.), Rucoflex™ S105-30 (hexane diol adipate with hydroxyl number around 30, from Ruco Polymer), and Rucoflex™ S107-30 (neopentylglycol adipate with hydroxyl number around 30, from Ruco Polymer).

The proportions of the ingredients used were as follows:

| Ingredient | Parts by Weight |
| --- | --- |
| Dynacoll ™ 7250 | 7.15 |
| Stepanpol ™ 2429-39 | 10.12 |
| Rucoflex ™ S105-30 | 31.95 |
| Rucoflex ™ S107-30 | 18.90 |
| Irganox ™ 245 | 0.03 |
| Silquest ™ A-171 | 0.15 |
| Goresil ™ 210 | 15.38 |
| MDI mixture | 16.26 |
| Beuzoyl chloride | 0.01 |
| Jeffcat ™ DMDEE | 0.05 |

Comparative B

A reactive hot-melt adhesive was prepared as in Example 2, except that the following ingredients were omitted: Irganox™ 245, Silquest™ A-171, Goresil™ 210, benzoyl chloride, and Jeffcat™ DMDEE. The remaining ingredients were used in the same proportions as in Example 2, but the amounts were all increased to make a preparation with the same total weight as in Example 2.

Example 3

A reaction vessel was set up with a gas inlet tube, thermometer, stirrer, vacuum, and a heating jacket. Polyols were preheated overnight at 75–85° C. to facilitate handling. 1508 g. Lexorez™ 1400–120P (hexanediol-neopentylglycol adipate polyester polyol with OH number about 120, molecular weight about 935, from Inolex Chemical), 2082 g. PPG™ 1025 (polyether polyol, molecular weight of about 1000, from PPG Ind.), 2 g. Blankophor™ SOL (UV indicator from BASF Corp.), 2 g. Irganox™ 245 (phenolic antioxidant, from Ciba-Geigy Corp.), and 1551 g. of Goresil 210 (cristobalite silica, from C.E.D. Minerals) were added to the reaction vessel and the temperature raised to 105° C. with stirring. After 30 minutes at 105° C. and a vacuum of 20 mm of mercury, the batch temperature was lowered to 90° C. 547 g. of 98/2 mixture of 4,4'-MDI and 2,4' MDI (Bayer Inc.) was added and the temperature was held at 100–105° C. for one hour with stirring and under nitrogen blanket. 3103 g. Rucoflex™ S105–30 (hexanediol adipate, with OH number about 30, molecular weight about 3750, from Ruco Polymer), and 13 g. Silquest™ A-171 (vinyl trimethoxysilane, from OSI Specialties) was added, and the reaction temperature was raised to 103–105° C., vacuum of 20 mm. mercury was applied for 30 minutes, and then the batch temperature was allowed to fall to 90° C. 1186 g. of the MDI mixture used in Example 1 was added, exotherm was observed, and the reaction temperature was held at 100–105° C. under nitrogen for one hour. During the last 40 minutes, stirring speed was reduced, and 200–300 mm. Hg vacuum was applied. After a one-hour hold, 1 g. benzoyl chloride and 5 g. Jeffcat™ DMDEE were added. Mixing continued for an additional 20–30 minutes under nitrogen. At this time reaction product was poured into a container which was then blanketed in dry nitrogen and sealed.

Comparative C

A reactive hot-melt adhesive was prepared as in Example 3, except that the Goresil™ 210 was omitted. The remaining ingredients were used in the same proportions as in Example 3, but the amounts were all increased to make a preparation with the same total weight as in Example 3.

Example 4

The test results on the Examples and Comparatives were as follows:

| Sample | Cristobalite Silica Parts by Weight | Time Between Assembly and Testing | Lap Shear Green strength |
|---|---|---|---|
| Comparative A | 0 | 5 minutes | 21 kilopascal |
| Example 1 | 10.0 | 5 minutes | 888 kilopascal |
| Comparative B | 0 | 3 minutes | 2 kilopascal |
| Example 2 | 15.4 | 3 minutes | 565 kilopascal |
| Comparative C | 0 | 5 minutes | 0.7 kilopascal |
| Example 3 | 15.5 | 5 minutes | 541 kilopascal |

In each case, when the cristobalite silica is left out of the composition, the lap shear green strength drops drastically.

I claim:

1. A composition useful as an adhesive comprising
   (a) 1% to 50% by weight based on the weight of said composition of cristobalite silica, and
   (b) 50% to 99% by weight based on said composition of moisture curable prepolymer,
wherein said moisture curable prepolymer comprises at least one urethane prepolymer comprising the reaction product of at least one polyol and at least one polyfunctional isocyanate.

2. The composition of claim 1 wherein the amount of said cristobalite silica is 9% to 16% by weight based on said composition.

3. The composition of claim 1 wherein said cristobalite silica is a powder with mean particle size of from 1 to 3 micrometers and maximum particle size of 25 micrometers.

4. The composition of claim 1 wherein said cristobalite silica is a powder with mean particle size of from 1 to 3 micrometers and maximum particle size of 25 micrometers and wherein the amount of said cristobalite silica is 9% to 1% by weight based on the weight of said composition.

* * * * *